United States Patent
Hosn et al.

(10) Patent No.: US 9,817,817 B2
(45) Date of Patent: Nov. 14, 2017

(54) DETECTION AND LABELING OF CONVERSATIONAL ACTIONS

(71) Applicant: INTERNATIONAL BUSINESS MACHINES CORPORATION, Armonk, NY (US)

(72) Inventors: Rafah A. Hosn, New York, NY (US); Robert J. Moore, San Jose, CA (US); Michal Shmueli-Scheuer, Ramat-Gan (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/072,848

(22) Filed: Mar. 17, 2016

(65) Prior Publication Data
US 2017/0270093 A1 Sep. 21, 2017

(51) Int. Cl.
*G06F 17/27* (2006.01)

(52) U.S. Cl.
CPC ........ *G06F 17/279* (2013.01); *G06F 17/2775* (2013.01)

(58) Field of Classification Search
USPC .................. 704/231–257, 270–275
See application file for complete search history.

(56) References Cited

U.S. PATENT DOCUMENTS

| | | | | |
|---|---|---|---|---|
| 7,162,414 B2* | 1/2007 | Stanford | ................ | G10L 15/08 379/93.09 |
| 7,219,058 B1* | 5/2007 | Rose | ...................... | G10L 15/08 704/231 |
| 2002/0135618 A1 | 9/2002 | Maes et al. | | |
| 2002/0147579 A1* | 10/2002 | Kushner | ................ | G10L 15/30 704/207 |
| 2003/0088421 A1* | 5/2003 | Maes | ...................... | G10L 15/30 704/270.1 |
| 2008/0306899 A1 | 12/2008 | Gregory et al. | | |
| 2009/0063144 A1* | 3/2009 | Rose | ...................... | G10L 15/08 704/236 |
| 2009/0234652 A1 | 9/2009 | Kato et al. | | |

(Continued)

FOREIGN PATENT DOCUMENTS

| | | |
|---|---|---|
| EP | 00264536 A1 | 10/2013 |
| WO | 02082793 A1 | 10/2002 |
| WO | 2011064938 A1 | 10/2002 |

OTHER PUBLICATIONS

Boyer et al. "Modeling Dialogue Structure with Adjacency Pair Analysis and Hidden Markov Models". Proceedings of NAACL HLT 2009, pp. 49-52.*

(Continued)

*Primary Examiner* — Jesse Pullias
(74) *Attorney, Agent, or Firm* — Cantor Colbnurn LLP; Bryan W Butler

(57) ABSTRACT

Technical solutions are described for generating structured conversational data. An example method includes receiving an utterance that is part of a conversation and identifying the utterance as part of an adjacency pair. The adjacency pair includes two utterances, each produced by different speakers. The method also includes associating the utterance with a label from a predetermined set of labels based on the identifying of the adjacency pair.

17 Claims, 16 Drawing Sheets

| Turn | Speaker | 1st position I mean... | 2nd position Do you mean? | 3rd position No, I mean... | 4th position Oh, you mean... |
|---|---|---|---|---|---|
| T1 | A | 1PPa | | | |
| T2 | B | 2PPa | 2PR (T1) | | |
| T3 | A | 1PPb | 2PR (T2) | 3PR (T1) | |
| T4 | B | 2PPb | 2PR (T3) | 3PR (T2) | 4PR (T1) |
| T5 | A | 1PPc | 2PR (T4) | 3PR (T3) | 4PR (T2) |
| T6 | B | 2PPc | 2PR (T5) | 3PR (T4) | 4PR (T3, T1) |

(56) References Cited

U.S. PATENT DOCUMENTS

2013/0179174 A1 7/2013 Comerford et al.
2014/0365226 A1* 12/2014 Sinha .................. G10L 25/00
 704/275

OTHER PUBLICATIONS

A. Stolcke et al., "Dialogue Act Modeling for Automatic Tagging and Recognition of Conversational Speech," SRI International, vol. 26, No. 3, 2000, pp. 1-35.

AMI Corpus, "Guidelines for Dialogue Act and Addressee Annotation Version 1.0," Oct. 13, 2005, pp. 1-34.

D. Jurafsky et al., "Switchboard SWBD-DAMSL Shallow-Discourse-Function Annotation Coders Manual,"Draft 13, University of Colorado at Boulder & +SRI International, Aug. 1, 1997, pp. 1-34.

E. Schegloff et al., "Opening Up Closings," American Sociological Association, San Francisco, Semiotica, vol. 8, 1973, pp. 289-327. Bibliographic update Jul. 1982, reprint with permission of Emanuel A. Schegloff.

E. Schegloff, "Repair After Next Turn: The Last Structurally Provided Defense of Intersubjectivity in Conversation," Univerversity of California, Los Angeles, American Journal of Sociology, vol. 97, No. 5, Mar. 1992, pp. 1295-1345.

E. Schegloff, "Sequence Organization in Interaction: A Primer in Conversation Analysis," Cambridge University Press, vol. 1, 2007, ISBN 13 978-0-521-82572-6 hardback, ISBN 13 978-0-521-53279-2 paperback, pp. 1-251, https://books.google.com/books/about/Sequence_Organization_in_Interaction_Vol.html?id=5XbJRFQ4dhsC.

J. Allen et al., "Draft of DAMSL: Dialog Act Markup in Several Layers," Sep. 22, 1997, pp. 1-46.

Jones, Lisa, "Explaining turn-taking constraints using a traditional conversation analysis approach in cross-examination courtroom interaction." PhD diss., University of Huddersfield, 2014, pp. 1-117.

* cited by examiner

| Turn | Speaker | 1st position<br>I mean... | 2nd position<br>Do you mean? | 3rd position<br>No, I mean... | 4th position<br>Oh, you mean... |
|---|---|---|---|---|---|
| T1 | A | 1PPa | | | |
| T2 | B | 2PPa | 2PR (T1) | | |
| T3 | A | 1PPb | 2PR (T2) | 3PR (T1) | |
| T4 | B | 2PPb | 2PR (T3) | 3PR (T2) | 4PR (T1) |
| T5 | A | 1PPc | 2PR (T4) | 3PR (T3) | 4PR (T2) |
| T6 | B | 2PPc | 2PR (T5) | 3PR (T4) | 4PR (T3, T1) |

Fig. 3

Labeling Scheme 40

| | |
|---|---|
| OTHER | Not part of an adjacency pair |
| B1PP | Base First-Pair Part |
| B2PP | Base Second-Pair Part |
| SC3 | Sequence-Closing Third |
| PR1PP | Pre-Expansion First-Pair Part |
| PR2PP | Pre-Expansion Second-Pair Part |
| IN1PP | Insert Expansion First-Pair Part |
| IN2PP | Insert Expansion Second-Pair Part |
| IN1PP-2PR | Insert Expansion First-Pair Part 2nd-Position Repair Initiator |
| IN2PP-2PR | Insert Expansion Second-Pair Part 2nd-Position Repair |
| PO1PP | Post-Expansion First-Pair Part |
| PO2PP | Post-Expansion Second-Pair Part |
| PO1PP-2PR | Post-Expansion First-Pair Part 2nd-Position Repair Initiator |
| PO2PP-2PR | Post-Expansion Second-Pair Part 2nd-Position Repair |
| PO1PP-3PR | Post-Expansion First-Pair Part 3rd-Position Repair Initiator |
| PO2PP-3PR | Post-Expansion Second-Pair Part 3rd-Position Repair |
| PO1PP-4PR | Post-Expansion First-Pair Part 4th-Position Repair Initiator |
| PO2PP-4PR | Post-Expansion Second-Pair Part 4th-Position Repair |

Labels 405

Adjacency Pair Positions 410

Fig. 4

INTIAL OR OPENING SEQUENCES

PRE-EXPANSION SEQUENCES

INSERT EXPANSION SEQUENCES

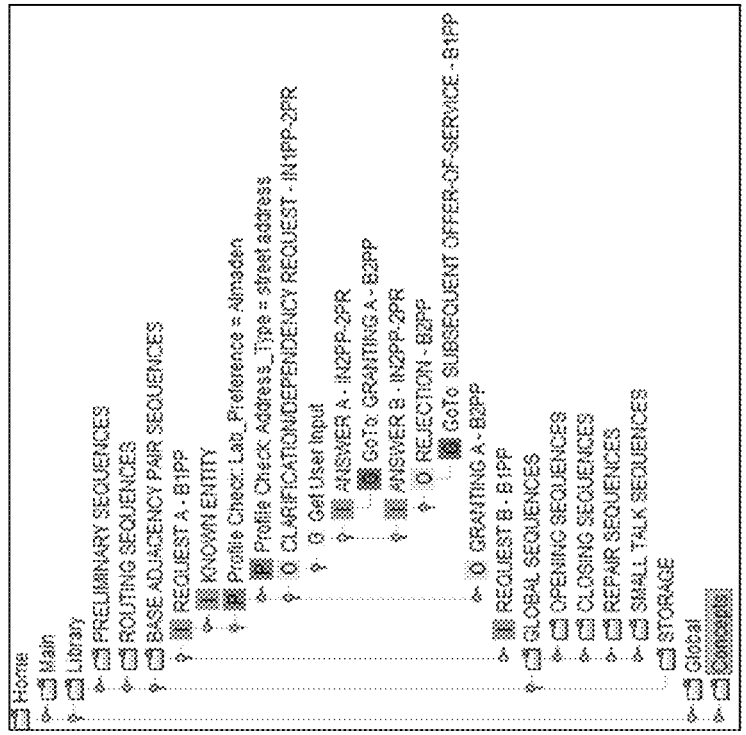
Fig. 9 INSERTION SEQUENCE FOR BASE ADJACENCY PAIR

POST-EXPANSION CLOSING SEQUENCE

POST-EXPANSION SEQUENCES FOR SECOND-POSITION REPAIRS

POST-EXPANSION SEQUENCES FOR THIRD- & FOURTH-POSITION REPAIRS

REPAIR SEQUENCES

Hi, my name is Watson. What's your name?~GREETING|IDENTIFICATION~B1PP|XXX
How can I help you?~INITIAL_OFFER-OF-SERVICE~B1PP
Hi~GREETING~B1PP
Hi, how are you today?~GREETING~HOW/AREYOU~B2PP~B1PP
I'm good.~NEUTRAL_ASSESSMENT~B2PP
That's good.~POSITIVE_ASSESSMENT~SC3
How can I help you?~INITIAL_OFFER-OF-SERVICE~B1PP
what can you do?~INQUIRY_CAPABILITY_CHECK~PR1PP
I can give you the names, locations and hours of places in the hotel and nearby.~ANSWER_CAPABILITIES~PR2PP
ok do you have a restaurant~INQUIRY_PLACE_CHECK~PR1PP
ok do you have a restaurant-in the hotel~PLACE_CHECK~PR1PP
Yes.~CONFIRMATION~PR2PP
Vista Grill.~OFFER~XXX
where is it~INQUIRY_LOCATION~B1PP
Vista Grill is located on the 3rd floor by the elevators.~ANSWER_LOCATION~B2PP
when does it close~INQUIRY_HOURS~B1PP
Vista Grill is open 5:00pm-11:00pm.~ANSWER_HOURS~B2PP
thanks~APPRECIATION~PO1PP
You're welcome.~YOUREWELCOME~PO2PP
Is there anything else I can do for you?~SUBSEQUENT_OFFER-OF-SERVICE~B1PP
know any jokes~REQUEST_JOKE~B1PP
What did the Buddhist say to the hot dog vendor?~GRANT_JOKE~B2PP/B1PP
i don't know~ABORT_SEQUENCE~B2PP
Make me One with everything.~PUNCHLINE~SC3
haha~ACKNOWLEDGMENT~SC3
Is there anything else I can do for you?~SUBSEQUENT_OFFER-OF-SERVICE~B1PP
no~DECLINATION~B2PP
Okay.~ACKNOWLEDGMENT~SC3
Did you find what you were looking for?~INQUIRY~PR1PP
yes~CONFIRMATION~PR2PP
Excellent!~POSITIVE_ASSESSMENT~SC3
Goodbye.~CLOSING~B1PP
bye~CLOSING~B2PP Format = [Utterance]~[Dialog-Act]~[Adjacency-Pair-Position]

Fig. 16

DETECTION AND LABELING OF CONVERSATIONAL ACTIONS

BACKGROUND

The present application relates to machine learning, and more specifically, to labeling conversational data, for the purposes of machine learning.

For machines to have a natural language conversation with a human user, text analytic techniques, and conversational systems, the machine has to detect social actions the user is performing in order to determine user intent and to respond appropriately. Current solutions typically label utterances in conversational data in terms of their "dialogue acts" and use these labels to train statistical classifiers. Alternatively, some solutions (such as Dialog Act Markup in Several Layers (DAMSL)) label utterances in terms of whether they are repairs on previous or "antecedent" turns.

SUMMARY

According to an embodiment, a computer implemented method for generating structured conversational data, includes receiving, by a processor, an utterance that is part of a conversation. The computer implemented method also includes identifying the utterance as part of an adjacency pair, where the adjacency pair includes two utterances, each produced by different speakers. The computer implemented method also includes associating the utterance with a label from a predetermined set of labels based on the identifying of the adjacency pair.

According to another embodiment, a system for generating structured conversational data includes a memory and a processor. The processor receives an utterance that is part of a conversation. The processor identifies the utterance as part of an adjacency pair, where the adjacency pair includes two utterances, each produced by different speakers. The processor also associates the utterance with a label from a predetermined set of labels based on the identifying of the adjacency pair.

According to another embodiment, a computer program product for generating structured conversational data includes a computer readable storage medium, where the computer readable storage medium includes computer executable instructions. The computer readable storage medium includes instructions for receiving an utterance that is part of a conversation. The computer program product also includes instructions for identifying the utterance as part of an adjacency pair, where the adjacency pair includes two utterances, each produced by different speakers. The computer program product also includes instructions for associating the utterance with a label from a predetermined set of labels based on the identifying of the adjacency pair.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

FIG. 3 illustrates an example with four structural positions from which repair can be initiated on a problematic turn and example labels in accordance with an embodiment.

FIG. 4 illustrates an example labeling scheme in accordance with an embodiment.

FIG. 9 illustrates an insertion sequence for the base adjacency pair in accordance with an embodiment.

FIG. 16 illustrates a result of an example execution of a labeling method in accordance with an embodiment.

DETAILED DESCRIPTION

Disclosed here are technical solutions for improving techniques for dialogue-act modeling by adding contextual data about conversational actions' sequential and repair positions. Conversational actions may be utterances that make up the conversation. The techniques facilitate an automatic and dynamic labeling of utterances as the utterances occur during an ongoing conversation using a labeling scheme. The labeling scheme classifies the utterances in terms of the utterances' positions in adjacency pair expansion, if any, and their repair position if any. The labeling scheme simplifies the classification of the utterances and thus training a machine using the labeling since the labeling scheme does not label utterances in terms of dialogue acts of which there are many and which are possibly open-ended. For example, dialogue acts may include, "request," "offer," "promise," "insult," and many more. Instead, the labeling scheme provided by the technical solutions described herein provides a fixed set of codes that is predetermined, such as a fixed set of 18 codes. When combined with text analysis of the words of the utterance, the positional labels facilitate providing statistical classifiers contextual information about the utterance's relationships to previous utterances, which improves classifier performance.

In exemplary embodiments, the utterance labels can be attached to conversational data through a rule-based dialog system. However, it will be obvious to a person skilled in the art that technical solutions described herein are readily applicable to automatically label a transcript of natural conversation that may be received. Using the rule-based system, the utterance labels are attached to input and output nodes in a dialog system (such as IBM's Watson Dialog Service™). For example, a user, such as a human, interacts with a machine that executes the dialog system, and the dialog system automatically labels the natural text strings using the labeling scheme. Thus, the rule-based system generates labeled data that a statistical classifier uses for training.

Figure 1:
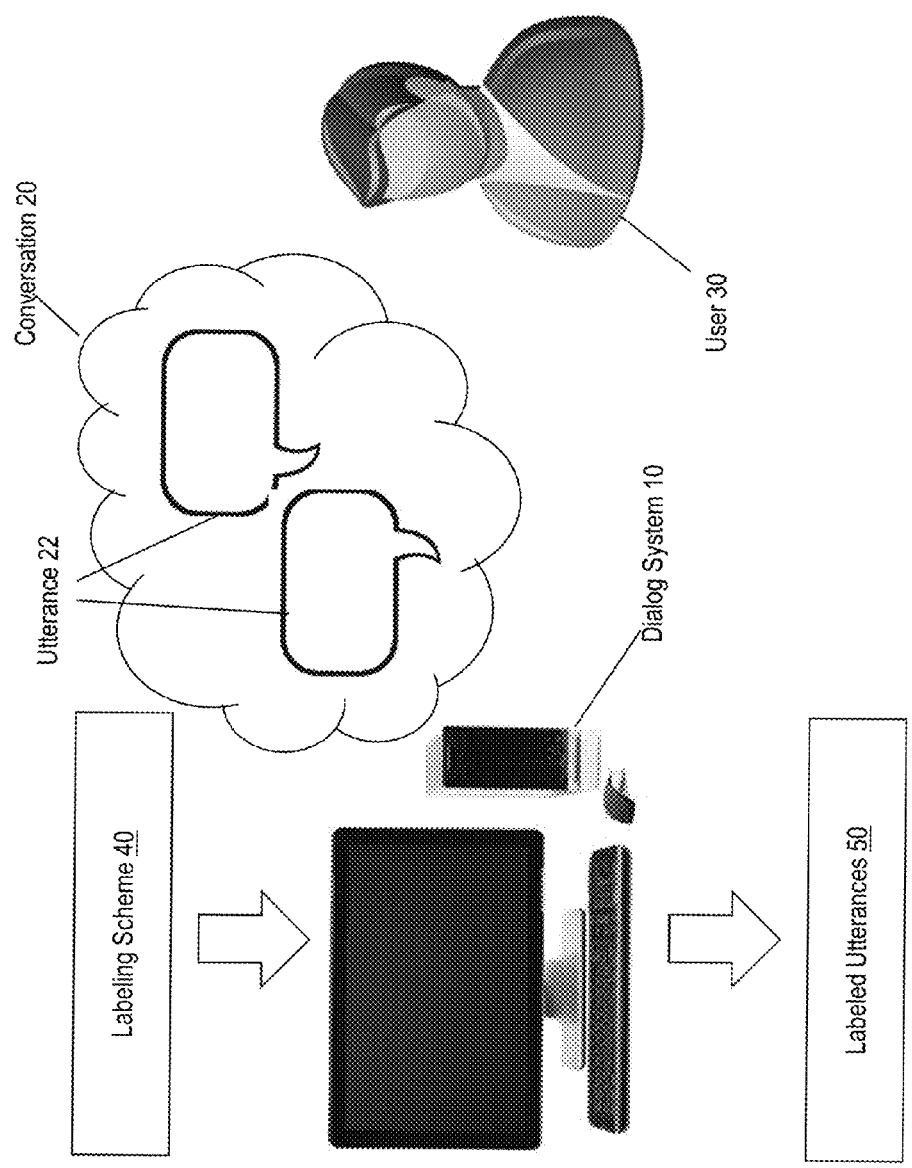
FIG. 1 illustrates an example system for automatic detection and labeling of conversational actions in accordance with an embodiment.

FIG. 1 illustrates an example system for automatic detection and labeling of conversational actions. The system includes a dialog system 10 that analyzes a conversation 20 between the dialog system 10 and a user 30. The conversation 20 includes at least one utterance 22, which may be any participant in the conversation 20. The dialog system 10 receives and analyzes each utterance 22 of the conversation as the utterance 22 occurs during the ongoing conversation 20. The dialog system 10 determines a label for the utterance 22, based on a labeling scheme 40. The dialog system 10 records labeled utterances 50, which the statistical classifier uses for training, for example, for training a machine for natural language conversations.

Figure 2:
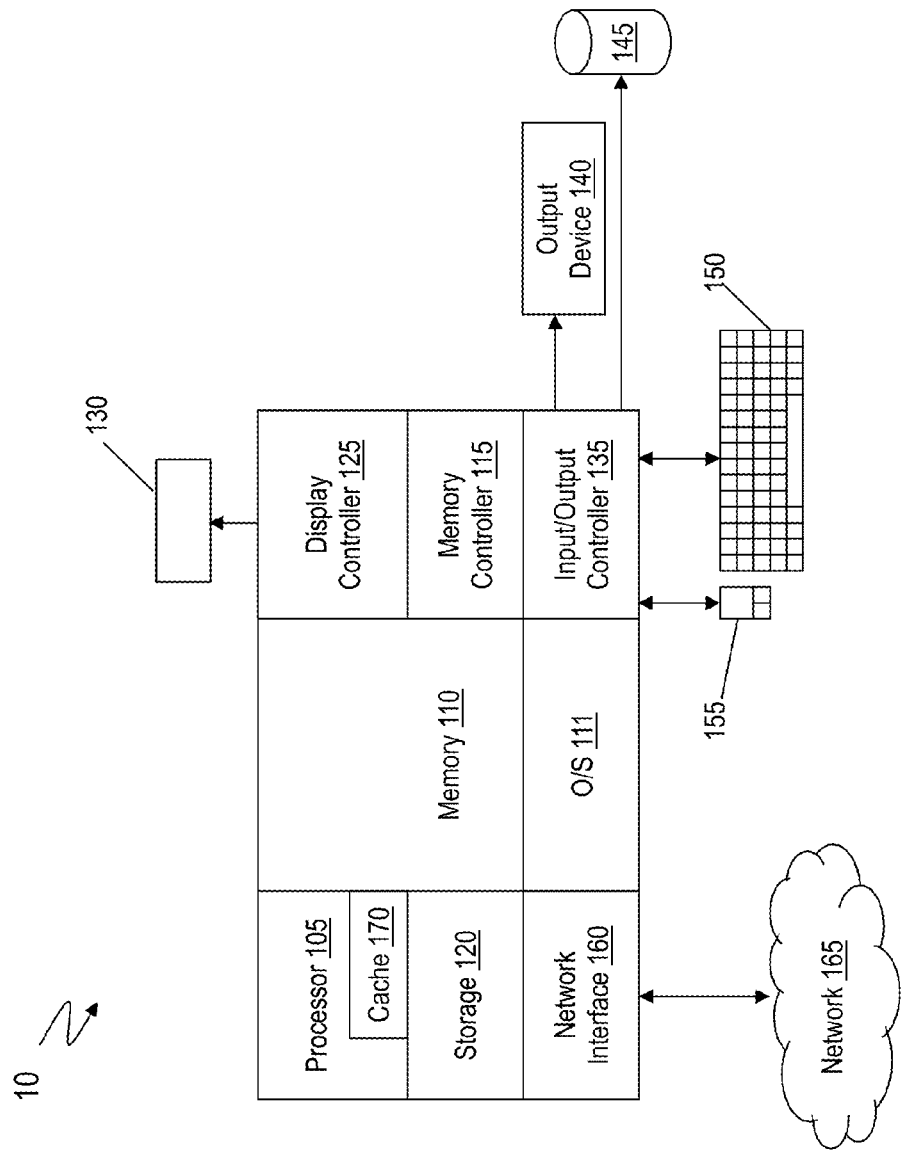
FIG. 2 illustrates an example dialog system in accordance with an embodiment.

FIG. 2 illustrates an example dialog system. The dialog system 10 may be a communication apparatus, such as a computer. For example, the dialog system 10 may be a desktop computer, a tablet computer, a laptop computer, a phone, such as a smartphone, a server computer, or any other device. The dialog system 10 may communicate via a network 165. The dialog system 10 includes hardware, such as electronic circuitry.

The dialog system 10 includes, among other components, a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors, indicator/identification lights and the like. Input devices such as a conventional keyboard 150 and mouse 155 may be coupled to the I/O controller 135. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the dialog system 10, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, and so on.).

The memory 110 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The dialog system 10 may further include a display controller 125 coupled to a user interface or display 130. In some embodiments, the display 130 may be an LCD screen. In other embodiments, the display 130 may include a plurality of LED status lights. In some embodiments, the dialog system 10 may further include a network interface 160 for coupling to a network 165. The network 165 may be an IP-based network for communication between the dialog system 10 and an external server, client and the like via a broadband connection. In an embodiment, the network 165 may be a satellite network. The network 165 transmits and receives data between the dialog system 10 and external systems. In some embodiments, the network 165 may be a managed IP network administered by a service provider. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

In an example, the dialog system 10 accesses the labeling scheme 40 that may be stored in the memory 110 or the storage 120. Alternatively or in addition, the dialog system 10 accesses the labeling scheme 40 from a remote location via the network 165. The dialog system 10 labels the utterance 22 that is part of the conversation 20 using the labeling scheme 40. The labeling scheme 40 is a set of predetermined labels 405 corresponding to respective adjacency pair positions 410.

An adjacency pair is a type of conversational sequence of utterances. The dialog system 10 identifies an adjacency pair from the conversation 20 based on predetermined characteristics. For example, the dialog system 10 identifies a sequence of two utterances, which are produced by different speakers, ordered as a first-pair part (1PP) and second-pair part (2PP), where a first pair part requires a particular second pair part (or range of second parts). In addition, the utterances in the adjacency pair may be adjacent to each other. The following are some examples of adjacency pair sequences: greeting-greeting, goodbye-goodbye, informing-acknowledgment or assessment-assessment. In some examples, adjacency pairs have binary response options, such as request-granting|rejection, inquiry-answer|refusal, invitation-acceptance|declination, offer-acceptance|rejection or complaint-excuse|remedy.

For example, upon the uttering of a request, such as, "Could you please pour me a coffee too?", whatever the recipient does next may be interpreted as a grant, for example, "Sure!," or a rejection, for example, "There's no more left." In this example, the request is the first-pair part (1PP), which proposes that a particular type of second-pair part (2PP), a granting or rejection, may come next and thereby creates the expectation that the recipient owes such a response. In an example, an adjacency pair is defined in terms of a social action the adjacency pair accomplishes, not the grammatical structure of the conversation or the utterances. For example, a request, like many other first-pair parts, may be accomplished with an interrogative form, "Could you please pour me a coffee too?" with a declarative, "I want a coffee too, please!" or with an imperative, "Please pour me a coffee too."

Some additional examples adjacency pairs are illustrated in Table 1.

TABLE 1

Greeting-greeting
1PP: Hello.
2PP: Hi.
Informing-acknowledgment
1PP: You dropped something.
2PP: Oh, thank you.
Offer-acceptance|declination
In this pair, 2PP either accepts or declines the offer made in 1PP, as shown in the following example:
1PP: Do you want a free milkshake?
2PP: Yes, please.
Invitation-acceptance|declination
In this pair, 2PP either accepts or declines the invitation from 1PP, as shown in the following example:
1PP: Want to go out?
2PP: Sure.

Note: some adjacency pairs have binary response options, such as, granting|rejection or acceptance|declination.

The adjacency pair cases illustrated so far occur with only two turns: the first-pair part and the second-pair part. In other examples, adjacency pairs can be expanded to arbitrary lengths using additional adjacency pairs. Such expansions make natural conversations powerful and versatile. For example, an adjacency pair model may include three structural positions for expansion with respect to a base adjacency pair: pre-expansion, insert expansion, and post-expansion.

Thus, the dialog system 10 identifies different types of adjacency pairs. A base adjacency pair is a sequence of two turns, such as the examples described earlier. Such an adjacency pair is considered a "base" pair because it contains a primary social action being performed. For example, consider an Invitation sequence "A: 1PP: Want to go out?; B: 2PP: Sure." In this base pair, Speaker A extends an invitation with, "Want to go out?" and Speaker B responds with a simple acceptance, "Sure." Invitation and acceptance are the primary social actions being accomplished here.

Additional actions may be performed for the purpose of supporting the primary actions or managing the conversation itself. An adjacency pairs that provides such support may be a post-expansion pair. For example, a base adjacency pair that has binary response options may occur with at least a minimal post-expansion, that is, a third turn initiated by the first speaker. For example, Speaker A in the above example may respond with "A: SC3: Great!".

"Great!" in this position is a sequence-closing third (SC3), or simply a receipt. In this example, it is a signal by Speaker A that the second-pair part was accepted and the sequence is closed. Other examples of SC3 may include "okay," and "thank you" with request sequences. Also, "oh" may be used in informing-acknowledgment sequences to indicate that the information given was news or a surprise to the recipient. Sequence-closing thirds, thus, provide feedback about the adequacy of the second-pair part for the first speaker (in the above example, speaker A). In the context of a conversation with the dialog system 10, such a SC3 response may be feedback from the user that the system's response was acceptable.

Alternatively, instead of a sequence-closing thirds, other post-expansions may consist of an additional adjacency pair. For example, consider conversation "A: 1PP: Want to go out?; B: 2PP: Sure; A: 1PP: Really?; B: 2PP: Of course!". In this case, A topicalizes B's acceptance in the third turn, with "Really?," and elicits a confirmation from her, "Of course!".

In addition to post-expansions, adjacency pairs can also be expanded with pre-expansions. Pre-expansions are adjacency pairs that come just before the base adjacency pair, which is dependent on the pre-expansion pair. For example, "A: 1PP: Are you busy tonight? B: 2PP: Not really; A: 1PP: Want to go out?; B: 2PP: Sure; A: 1PP: Really?; B: 2PP: Of course!" In this example, the first-pair part, "Are you busy tonight?" is a pre-invitation. Such a turn may be interpreted as an unmotivated inquiry, and as part of preliminaries to invitations or requests. Thus, a pre-expansion pair is an expansion of the base pair sequence because depending on the response that the pre-expansion pair elicits, the base pair sequence may or may not be produced. In this case, the second-pair part, "Not really," signals to A that B may be open to an invitation to do something that evening.

A third kind of sequence expansion to the base adjacency pair is an insert expansion. The insert expansion may occur in between the first- and second-pair parts of the base pair sequences. For example, consider the ongoing example, "A: 1PP: Are you busy tonight?; B: 2PP: Not really; A: 1PP: Want to go out?; B: 1PP: Where?; A: 2PP: The sushi place; B: 2PP: Sure; A: 1PP: Really?; B: 2PP: Of course!". In this example, B proposes that her ability produce the base second-pair part, an acceptance or declination, is dependent on A's response to the inserted first-pair part, "Where?". Upon receiving the second-pair part to that question, "The sushi place," B then accepts the invitation. Insert expansions, thus, are used to manage a recipients' dependencies on the base second-pair part, in this case, the acceptance or declination.

Thus, in a typical conversation, common action sequences or adjacencies pairs may be accomplished in three turns, which include a minimal sequence-closing third, or in more than three turns, using expansion pairs. The expansion pairs provide speakers with the ability to manage real-world dependencies.

In addition, expansion pairs may facilitate the speakers to handle interactional troubles faced during the conversation. For example, speakers may expand adjacency pairs in order to initiate a repair on prior turns. 'Repair' is a set of methods for managing troubles in speaking, hearing, or understanding. For example, a repair may be a repeat or an alternative wording of a whole or part of a prior turn. The repair may be initiated or produced by the speaker or by a recipient.

Returning to our earlier example, either speaker may indicate trouble in hearing or understanding a prior turn by the other. For example, consider the conversation, "A: 1PP: Are you busy tonight?; B: 1PP: Busy when?; A: 2PP: Tonight; B: 2PP: Not really; A: 1PP: Want to go out?", which may be followed with other utterances illustrated in other examples. In this case, B initiates a repair on A's pre-invitation with, "Busy when?." Such a repair, for example, may propose a difficulty in hearing the word that A said after the word 'busy' and thereby, elicits a repeat of the word, "Tonight" by A. Thus, in this example, an insertion sequence is done inside of a pre-sequence.

In addition to hearing troubles, repairs may also deal with troubles in understanding. For example, consider a part of the example conversation, "A: 1PP: Want to go out?; B: 1PP: You mean on a date?; A: 2PP: Maybe; B: 1PP: Where?; A: 2PP: The sushi place; B: 2PP: Sure; A: 1PP: Really?; B: 2PP: Of course!". In this example, B responds to the invitation with a request for clarification of the nature of the invitation: "You mean on a date?". This kind of repair deals, not with the particular words that A said, but with what A meant by saying the words. Thus, the repair in this case formulates an interpretation of the words for A to confirm or reject. In this example, A gives a weak confirmation with "Maybe."

Since, speakers can experience trouble in hearing or understanding any prior turn, sequence expansions that seek repair can occur anywhere in a conversation. Accordingly, adjacency pairs are infinitely expandable. However, in practice, speakers usually give up after only a couple of attempts at repairing the same turn.

Returning to the invitation example, instead of responding with a clear acceptance, B may respond with something that looks more like a declination. For example, "A: 1PP: Are you busy tonight?; B: 1PP: Busy when?; A: 2PP: Tonight; B: 2PP: Not really; A: 1PP: Want to go out?; B: 1PP: You mean on a date?; A: 2PP: Maybe; B: 1PP: Where?; A: 2PP: The sushi place; B: 2PP: Well, I really need to wash my hair tonight; A: 1PP: Oh, you mean you can't go?; B: 2PP: No, sorry."

Here, after the two insertion sequences, B reports a circumstance, "Well, I really need to wash my hair tonight," which neither explicitly accepts nor declines the invitation. By reporting a competing activity, B implies a declination. In response, A does a sequence-closing third "oh" and initiates a repair on the meaning of the reporting, "you mean you can't go?". This first-pair part projects a confirmation next, which B produces, "No, sorry." Thus, the ability to initiate repair on the base second-pair part is critical for A and B to achieve mutual understanding. In the dialog system 10, A may be the user and the base second-pair part, the system's answer to the user's inquiry or response to the user's request.

Thus, the expandable adjacency pair model is a set of building blocks with predictable positions. Each position provides one or the other speaker with opportunities for managing dependencies or repairs. As described throughout, a pre-expansion facilitates a speaker to manage dependencies on the base first-pair part. The base first-pair part facilitates the speaker to produce a main action. An insert expansion facilitates a recipient to manage dependencies on the base second-pair part or repairs on the base first-pair part. The base second-pair part facilitates the recipient to produce a response to the main action. Further, a post-expansion facilitate the speaker to manage dependencies or repairs on the base second-pair part or repairs on the base first-pair part.

FIG. 3 illustrates an example with four structural positions from which repair can be initiated on a problematic turn and example labels. In the illustration of FIG. 3, the labels 1PR, 2PR, 3PR, and 4PR represent a "1st-position repair," a "2nd-position repair," a "3rd-position repair" and a "4th-position repair," respectively. In addition, the turn number in parentheses next to each repair turn refers to the turn that is being repaired ("trouble source"). For example, "3PR (T1)" represents a "3rd-position repair on turn 1." When speakers initiate repair from different positions, they tend to use different utterance prefaces, such as, "I mean . . . ", "Do you mean?", "No, I mean . . . ", "Oh, you mean . . . " respectively. Of course, other examples are possible. Labeling the utterances accordingly facilitate providing markers that can help identify particular types of repair.

FIG. 4 illustrates an example labeling scheme 40. The labeling scheme 40 includes labels 405 that identify corresponding adjacency pair positions 410 described herein. The dialog system 10 upon receiving an utterance 22 of the conversation 20, identifies the corresponding adjacency pair position of the utterance in the conversation 20 and accordingly assigns the utterance 22 a corresponding label based on the labeling scheme 40. The labeled utterances 50 include the resulting data, which stores the "Utterance 22+Structural Label." For example, a labeled utterance may be "so you're requesting a card for your son"+PO1PP-2PR. Thus, the technical solutions facilitate generation of the labeled utterances 50, in which each record includes Uttered Words and Structural Label. The labeled utterances 50 is used to train a statistical classifier. Of course, the labeling scheme 40 illustrated in FIG. 3 is just one of several example labeling schemes possible.

Figure 5:
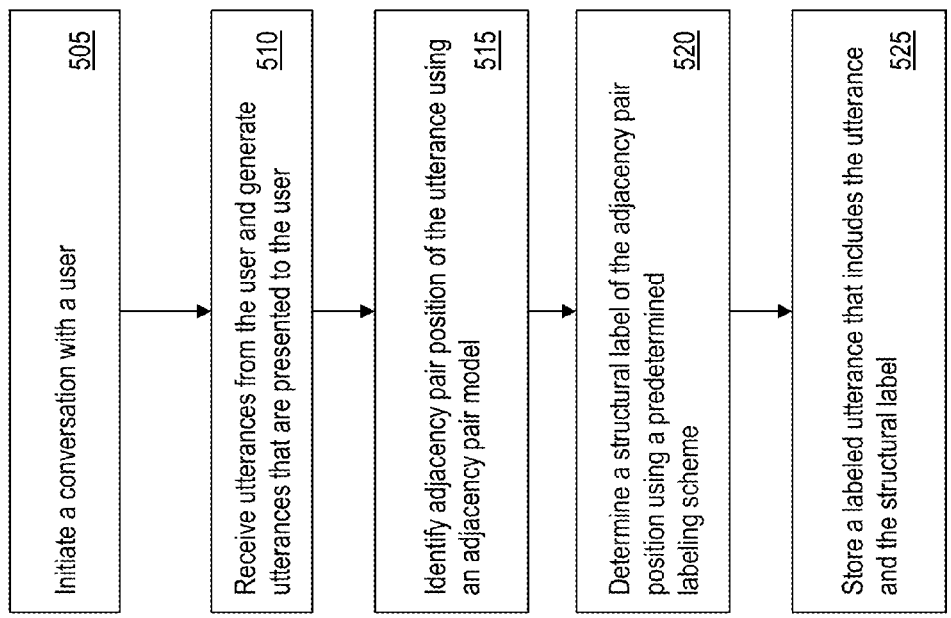
FIG. 5 illustrates an example flowchart of a method for automatic detection and labeling of conversational utterances in accordance with an embodiment.

FIG. 5 illustrates an example flowchart of a method for automatic detection and labeling of conversational utterances. In an example, the method may be implemented by the dialog system 10. In another example, the method may be implemented by another computing device, which includes similar hardware components as those in the dialog system 10. For example, the other computing device may use the dialog system 10 to interact with the user 30.

The example method is illustrated using an example conversation for customer-service encounters. Of course, the technical solutions described herein can be applied to conversations in any other domain.

Figures 6A, 6B:
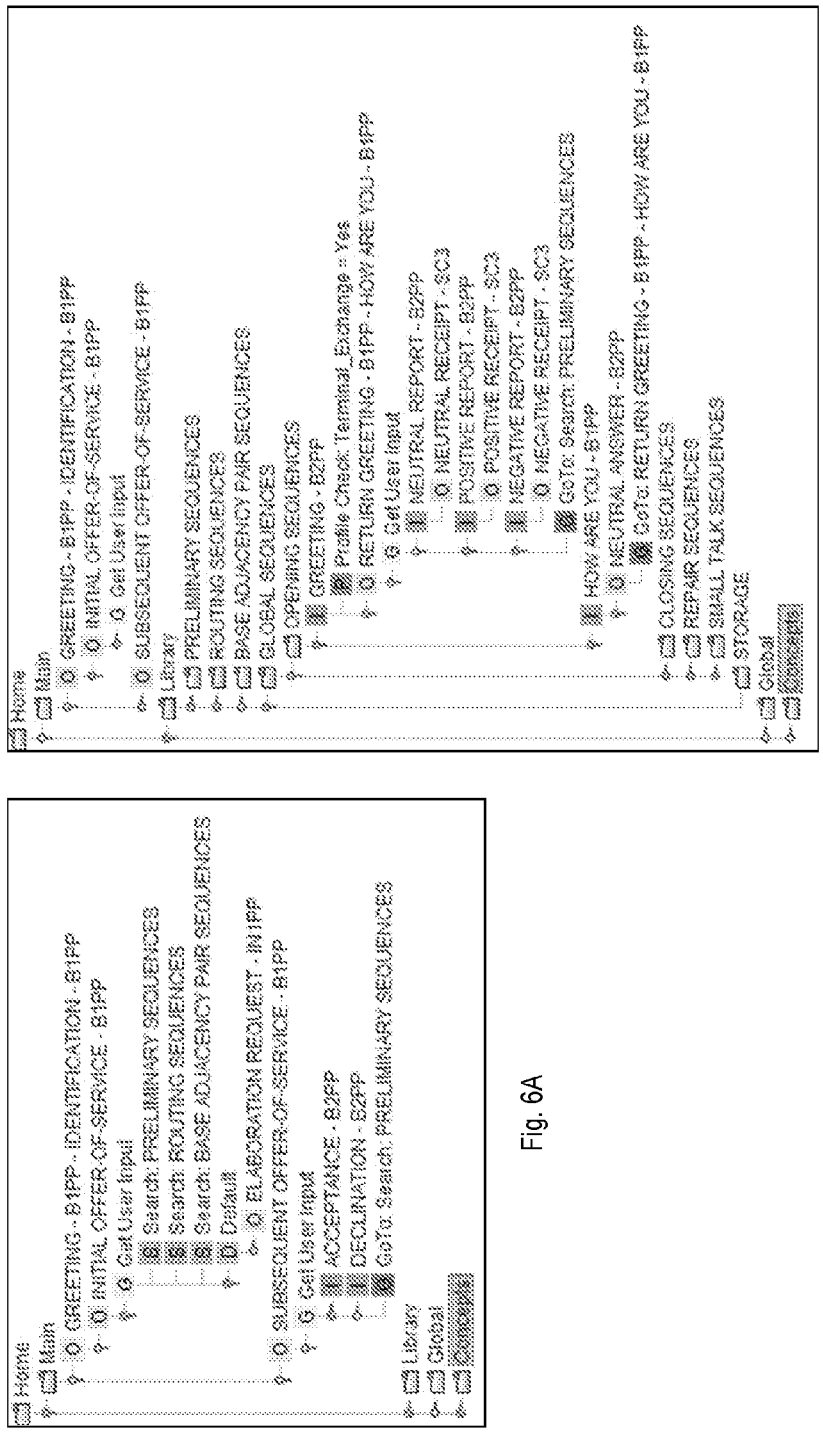
FIG. 6A illustrates example initial or opening sequences of utterances in accordance with an embodiment.
FIG. 6B illustrates example initial or opening sequences of utterances in accordance with an embodiment.

The example method may include initiating the conversation 20 with the user 30, as shown at block 505. FIG. 6 illustrates example initial or opening sequences of utterances that the dialog system 10 may generate and/or receive. For example, referring to FIG. 6A, in the service encounters domain, the conversation may be initiated by the dialog system 10 generating and outputting a greeting (1PP) combined with a offer-of-service so that the user's service request/problem report (1PP) is elicited in his or her first turn (user is not given a slot to return the greeting). For example, offers-of-service may be "How can I help you?" or "What can I do for you?" or a specific one, "Can I help you find movies?".

The method may further include receiving utterances from the user 30 and generating further utterances that are presented to the user 30, as shown at block 510. In the above example, still referring to FIG. 6A, in response to the initial utterance generated by the dialog system 10, the user's service request may take the form of an explicit request, "What is the address for Almaden?" or an implied request, "I can't find the address for IBM Almaden." In an example, as shown in FIG. 6A, a default search node in the dialog system 10, requests an elaboration or paraphrase of user's service request, "What is the address for Almaden?" by saying, "What do you mean?" and eliciting an alternate version, "What is the address for Almaden?".

In another example, as illustrated in FIG. 6B, the dialog system 10 may receive, from the user 30, a greeting, such as "Hello," in response to the initial greeting presented by the dialog system 10. the system initiates a how-are-you sequence, "How are you?" For example, there may be three classes of responses to the how-are-you, neutral, positive and negative, and accordingly, the dialog system 10 may generate different receipts depending on the report: "Good," "That's great!" or "I'm sorry to hear that." In an example, the dialog system 10 may not probe the positive or negative reports as speakers sometimes do in a natural conversation.

Figure 7A:
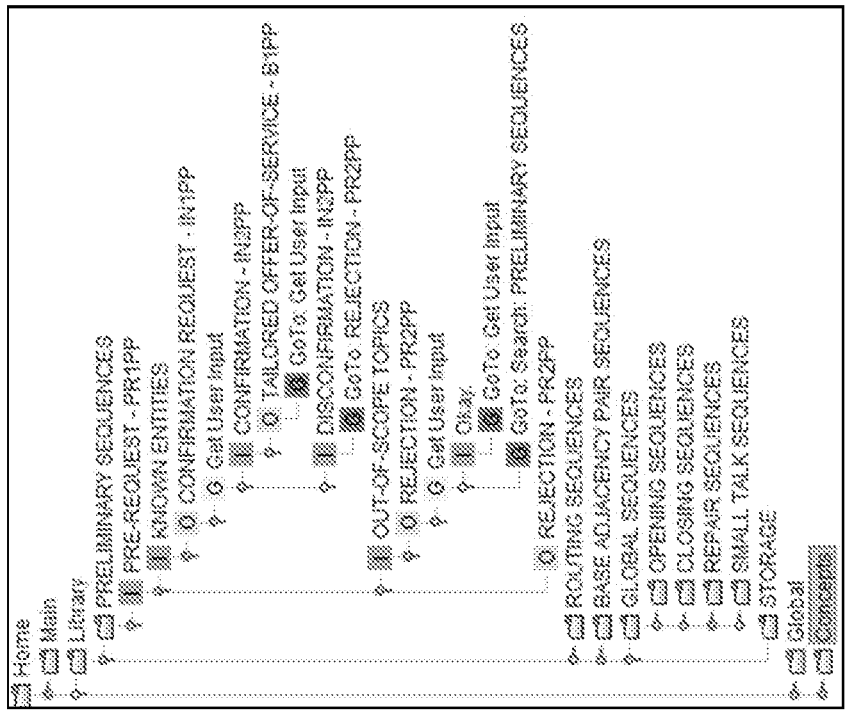
FIG. 7A illustrates example flow for pre-expansion sequences in accordance with an embodiment.

Once the opening sequence is complete, the dialog system 10 may generate and receive utterances for pre-expansion sequences. FIG. 7A illustrates example flow for pre-expansion sequences. For example, in the illustration related to the ongoing customer-service scenario, a pre-expansion sequence may deal with the user inquiries before making a request. For example, in preparation for asking, "What is the address for Almaden?" the user 30 may first ask, "Do you know about IBM Almaden?" If the response to this preliminary is negative, then the subsequent request may not be made. In a parallel example, in preparation for asking, "Do you want to go out?" the user 30 may first ask, "Are you busy tonight?" and if the response is positive, then the subsequent invitation will not be extended.

Figure 7B:
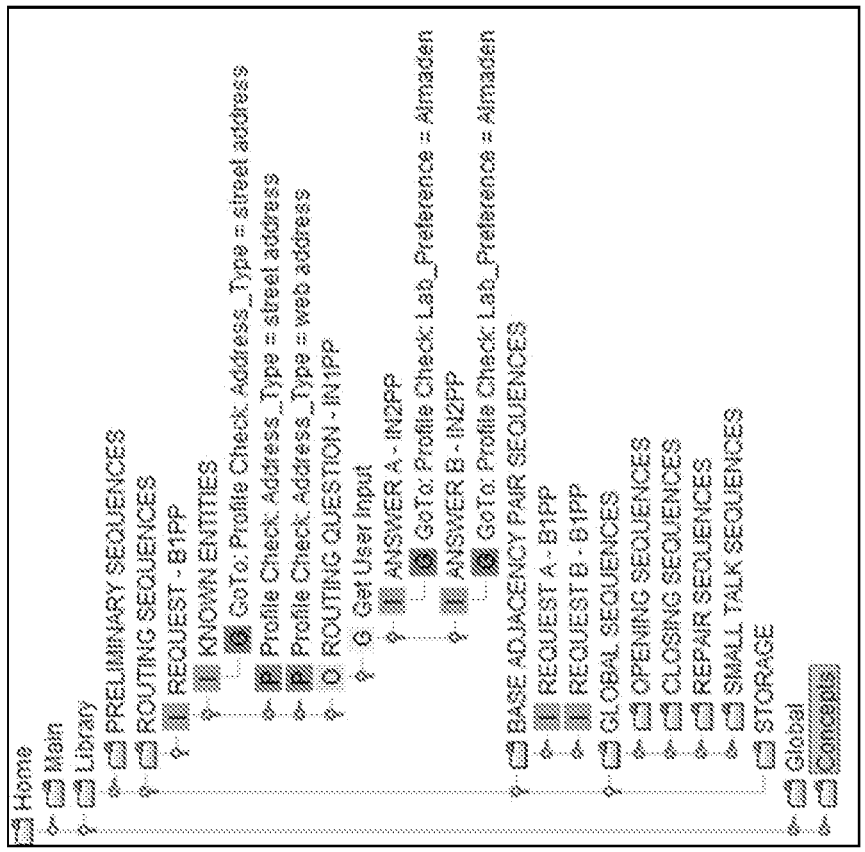
FIG. 7B illustrates an example flow for insert expansion sequences in accordance with an embodiment.

In another example, once the initial request is received, the dialog system may generate and receive utterances that are part of an insert expansion sequence. FIG. 7B illustrates an example flow for insert expansion sequences. For example, the dialog system 10 may generate routing questions in response to the request from the user 30. The routing questions may deal with system dependencies on the granting. In this case, the request is routed to more than one request sequences in the dialog system 10. For example, the user's request, "What is the address for Almaden?" could be routed to "What is the street address for Almaden?" or "What is the web address for Almaden?", as illustrated in FIG. 7B. Thus, the routing sequence contains a routing question, "Street address or web address?" designed to elicit a resolution of the system's dependency.

Figure 8:
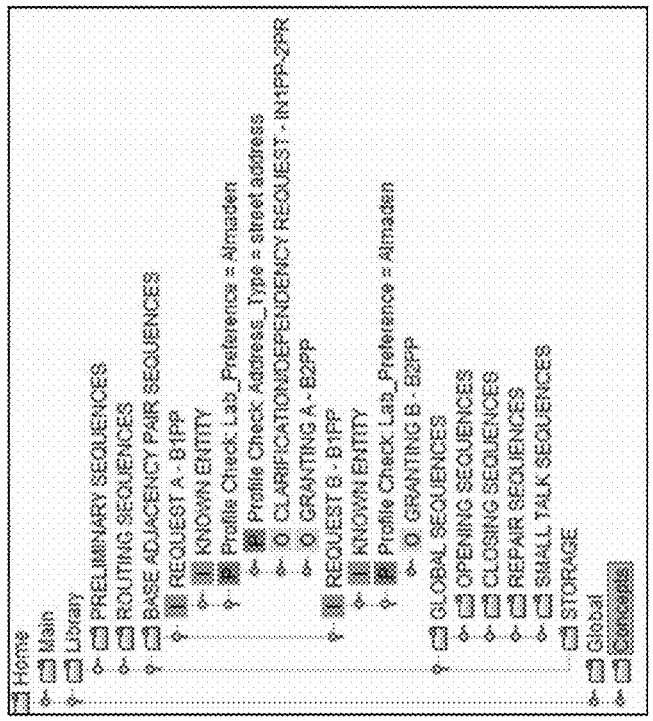
FIG. 8 illustrates an example flow for the base adjacency pair sequence in accordance with an embodiment.

In addition, the dialog system 10 generates and receives utterances of the base adjacency pair sequence. FIG. 8 illustrates an example flow for the base adjacency pair sequence, such as request-granting/rejection. In the ongoing example, the base adjacency pair represents the information request, "What is the street address for Almaden?" and the corresponding granting, "IBM Almaden is located at 650 Harry Road, San Jose, Calif., 95120, USA." In an example, the dialog system 10 generates an insertion sequence associated with the main request sequence that deals with system dependencies on the granting. In this case, the dependency applies only to one request sequence. For example, FIG. 9 illustrates an insertion sequence for the base adjacency pair. As illustrated, the insertion sequence is generated to receive user input to clarify the request from the user 30, and upon receipt of the clarification, the dialog system 10 provides the granting, or rejection, of the request based on the clarification. For example, in an earlier example described herein, the dialog system 10 responds to the user's invitation, "Do you want to go out to dinner?," with another request, "You mean on a date?".

Figures 10A, 10B:
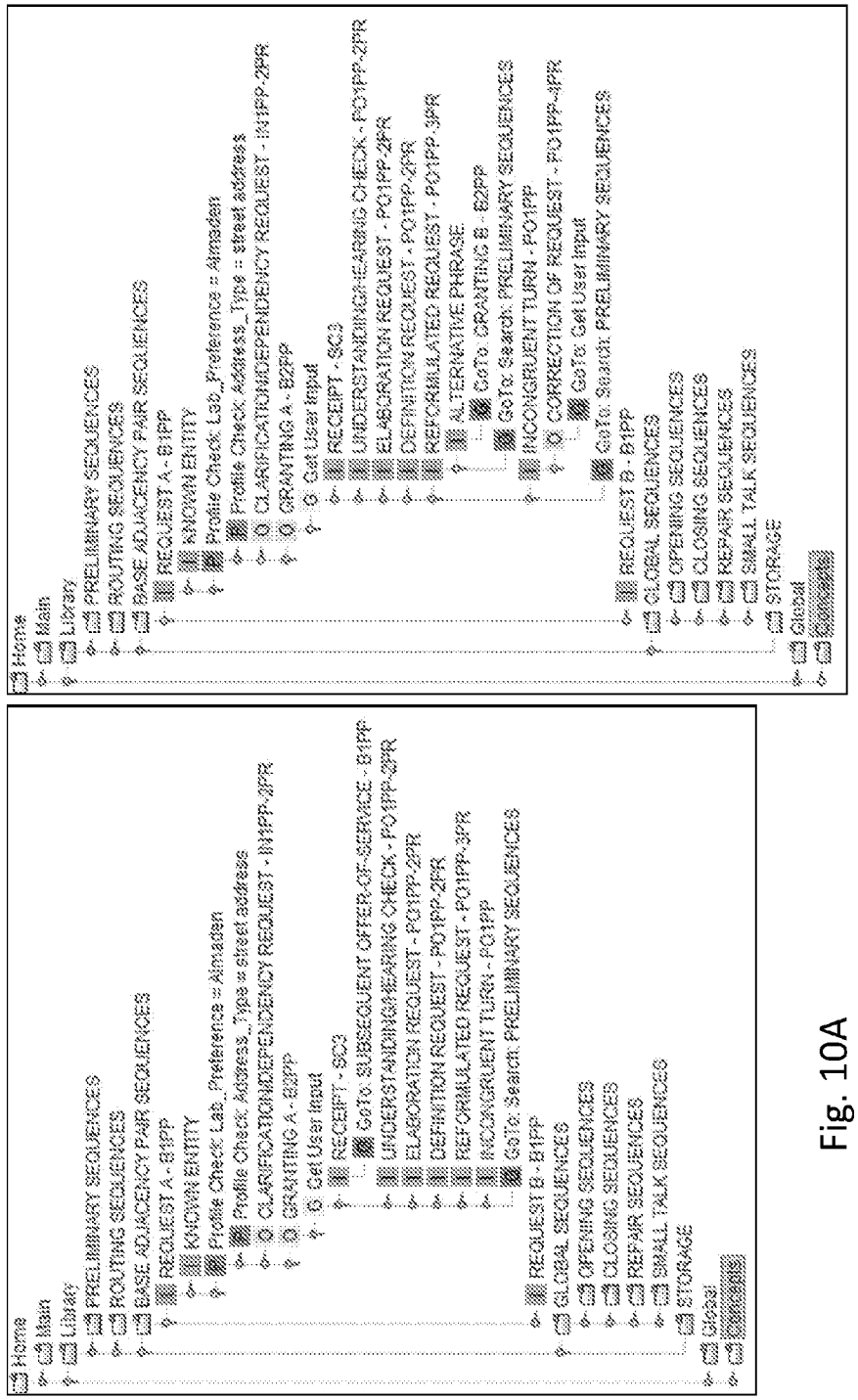
FIG. 10A illustrates minimal post-expansion sequences in accordance with an embodiment.
FIG. 10B illustrates requests for a second-position repair in response to a granting in accordance with an embodiment.

Further, the dialog system 10 generates and/or receives post-expansion sequences. For example, the post-expansion sequences may be for the request sequence that immediately follows the granting or rejection and deals with user dependencies on either the response to the request or the request itself. FIG. 10A illustrates minimal post-expansions, which signal the closing of the request sequence. For example, in response to, "IBM Almaden is located at 650 Harry Road, San Jose, Calif., 95120, USA" the user 30 responds with, "okay" or "thanks." In another example, the post-expansion may include repairs.

FIG. 10B illustrates the user 30 requesting a second-position repair in response to the granting from the dialog system 10. For example, in response to, "IBM Almaden is located at 650 Harry Road, San Jose, Calif., 95120, USA," the user 30 might do a second-position repairs based on an understanding/hearing check by requesting a confirmation of candidate hearing, "650 Harry Road?" or an interpretation, "in the Bay Area?" of the request response. The dialog system 10, in turn, responds with a simple confirmation, "Yes." Alternatively, the user 30 might do the second-position repairs based on an elaboration request, by requesting an alternative formulation of the request response such as, "What do you mean?". In this case, the dialog system 10 offers an elaboration, "That's the street address. It's about 50 miles south of San Francisco." In yet another example, the user 30 might do the second-position repairs based on a definition request by requesting a definition of a particular term in the request response, such as "What does Almaden mean?". The dialog system 10 may respond with, ""Almaden" is the name of an area of south San Jose.

Figures 11A, 11B:
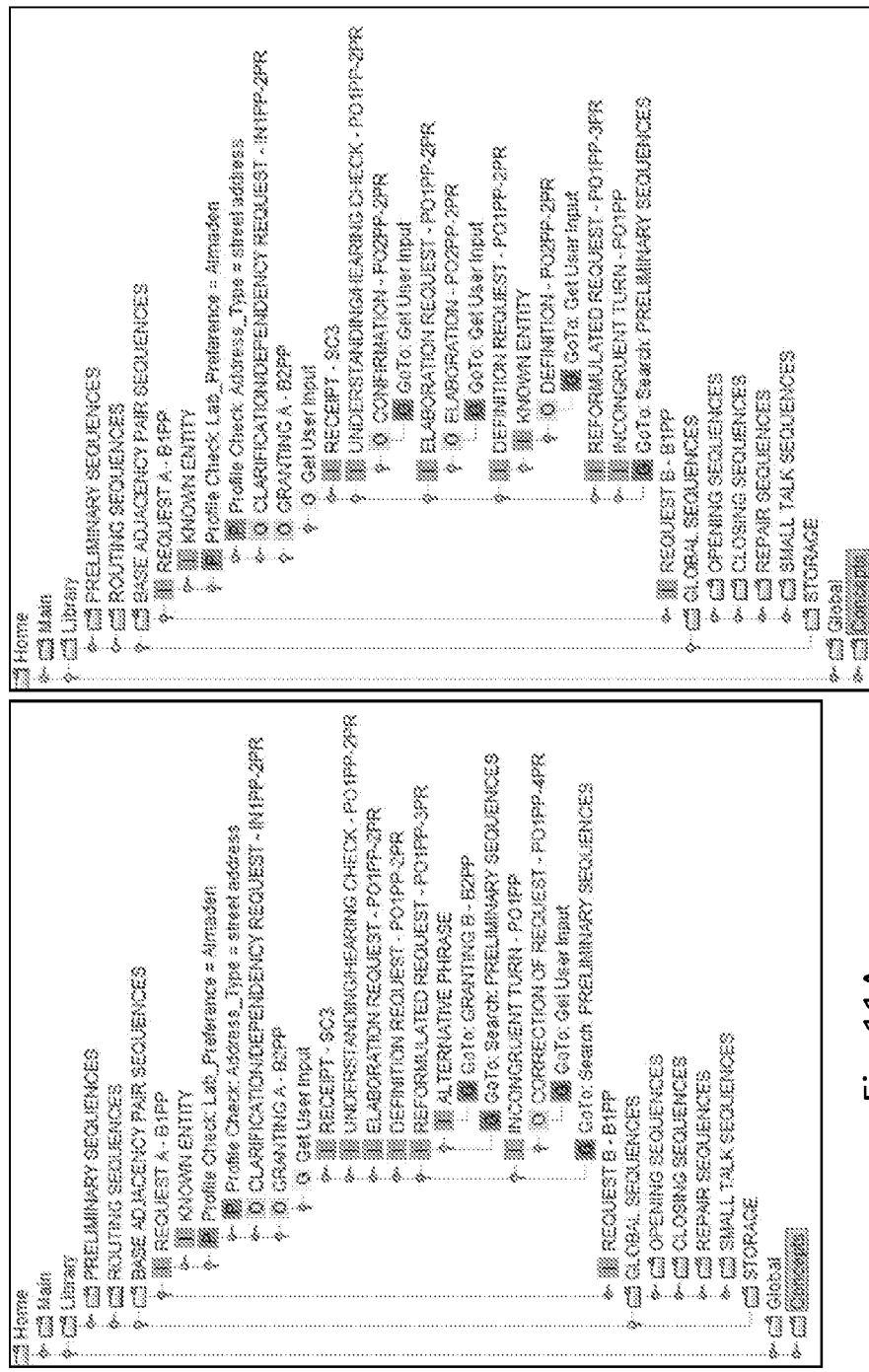
FIG. 11A illustrates example data flows for third- & fourth-position repairs in accordance with an embodiment.
FIG. 11B illustrates example data flows for third- & fourth-position repairs in accordance with an embodiment.

In another example, the dialog system 10 may generate and/or receive post-expansion sequences for third- & fourth-position repairs. FIG. 11A and FIG. 11B, each illustrate example data flows for third- & fourth-position repairs. For example, in response to, "IBM Almaden is located at 650 Harry Road, San Jose, Calif., 95120, USA," the user 30 may input a reformulated request. For example, the user 30 paraphrases the original request, such as "No I mean the address for the one on Bailey Road." In response, the dialog system 10 responds with a result for the reformulated request, for example, "IBM Silicon Valley Lab is located at 555 Bailey Ave., San Jose, Calif., 95141, USA." Alternatively, the user 30 indicates an incongruent turn, which is a problem in the request that was made, such as "Isn't that on Bailey Road?". In response, the dialog system 10 repairs the result and generates an utterance such as "Oh, you mean the Silicon Valley Lab, not Almaden." Thus, the dialog system 10 generates utterances related to third- & fourth-position repairs, which may in response to an utterance from the user 30 indicating an understanding/hearing check, an elaboration request, a definition request, a reformulated request, an incongruent turn, or any other repair.

Figures 12A, 12B:
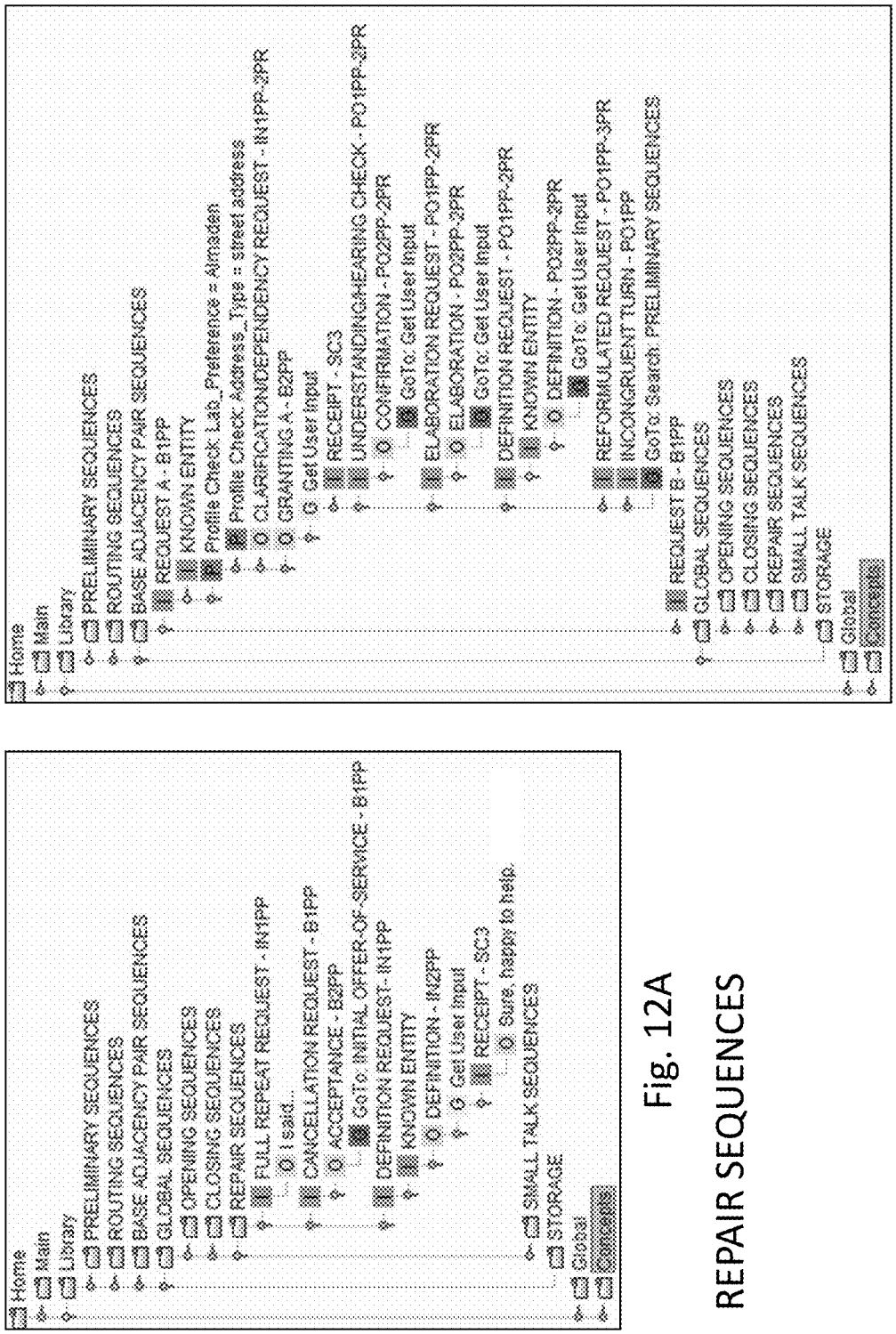
FIG. 12A illustrates example data flows for generating repair sequence utterances in accordance with an embodiment.
FIG. 12B illustrate example data flows and corresponding keywords or phrases that trigger generation of corresponding utterances when generating repair sequences in accordance with an embodiment.

When generating an utterance for a repair sequence, the dialog system 10 determines what utterance to generate based on the utterance in the prior turn. FIG. 12A illustrates example data flows for generating repair sequence utterances. For example, if the user 30 requests a full repeat of the prior turn, such as with "What did you say?" or "say again," the dialog system 10 may mark the utterance in the prior turn with, "I said . . . " and repeat the utterance in the prior turn. Alternatively, or in addition, if the user 30 cancels the prior turn, such as with "never mind," the dialog system 10 accepts and redirects the user 30 to the initial operation, such as the offer-of-service, and repeat the opening sequence, such as "How can I help you?". Alternatively, or in addition, if the user 30 requests a definition of a term, such as "What does IBM stand for?" the dialog system 10 provides the definition, in this example, "International Business Machines," and then returns to the previous node. In an example, when returning, the dialog system 10 repeats the utterance in the prior turn.

To detect if a repair sequence is to be generated, the dialog system 10 may detect trigger words or phrases. FIG. 12B illustrate example data flows and corresponding keywords or phrases that trigger generation of corresponding utterances when generating repair sequences. For example, trigger words such as Okay/oh/thanks in 3rd position is indicative acknowledges response and closes current sequence. Alternatively or in addition, a request for a partial repeat in 3rd position triggers a request for confirmation of partial repeat or interpretation of the prior request. Alternatively or in addition, a user input such as "What did you say?/Say again" in global, that is at any time during the conversation 20 elicits a repeat of the utterance in the prior turn. Instead, a user input such as "What do you mean?" in 3rd position elicits an elaboration of whole the prior request. A user input such as "What does (word) mean/stand for?" in 3rd position or in global elicits a definition of a word or phrase in the prior request. In response to receipt of user input such as "No,/no, I mean (followed by new words)" in 3rd position triggers the dialog system 10 to repair a prior request from the user 30. Further, a user input such as a "Never mind/nevermind/nvm" in global cancels a previous turn, and the dialog system 10 may restart from the opening sequence. Alternatively or additionally, a user input such as "I need to go/gotta go/gtg" in global proposes closing the conversation, and the dialog system 10 ends the conversation 20, without going to the opening sequence again. Thus, the dialog system 10 generates utterances for presenting to the user 30 based on the position of the utterances in the prior turn in an adjacency pair sequence and further upon contents of the utterance received from the user 30.

Figure 13:
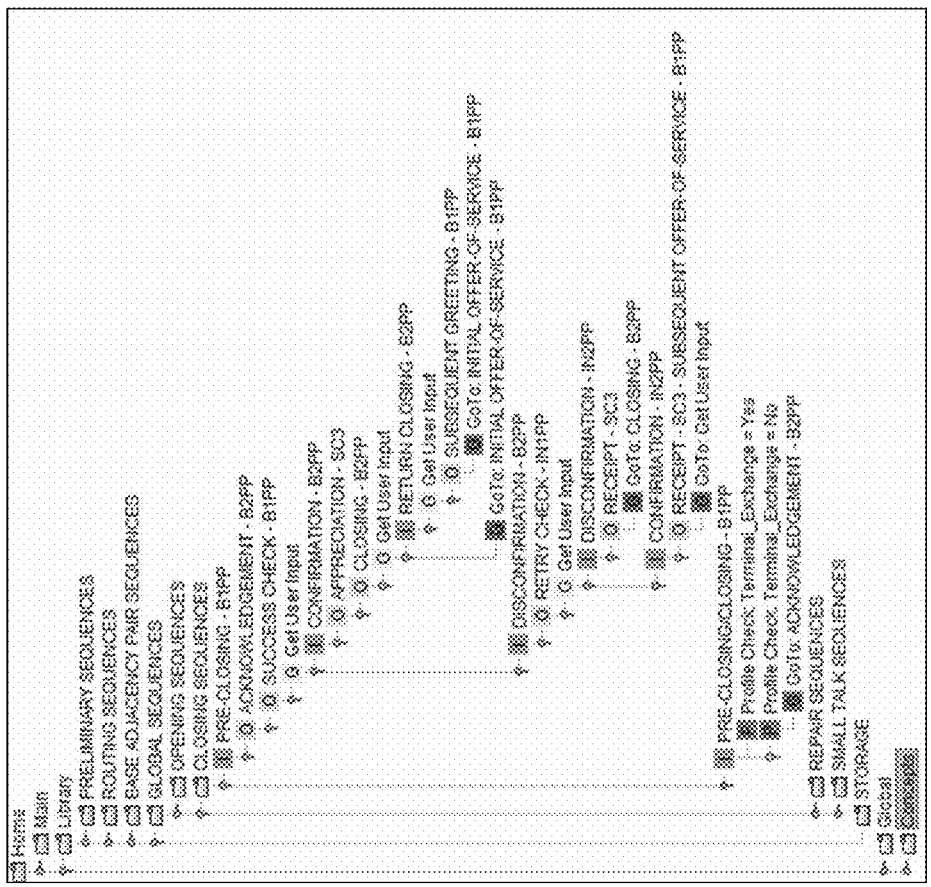
FIG. 13 illustrates example data flows for initiating closing sequences in accordance with an embodiment.

Additionally, the user 30 may initiate the closing of the conversation 20 at any time. FIG. 13 illustrates example data flows for initiating closing sequences. For example, if the user 30 inputs, "I need to go" or "goodbye," the dialog system 10 treats such an input as a pre-closing and initiates a success check by generating an utterance like ""Did you find what you were looking for?". If the user 30 indicates a failure, the dialog system 10 invites the user 30 to try again, for example, "Would you like to try again?" Alternatively, if the user 30 indicates success, the dialog system 10 initiates a closing by generating an utterance such as "Goodbye." If the user 30 says, "goodbye" in this position, the dialog system 10 identifies the utterance as the second pair part of a closing instead of as a pre-closing. Additionally, if they user 30 provides an input again, after the interaction is closed, the dialog system 10 re-engages with a subsequent greeting utterance, such as "Welcome back!"

Figure 14:
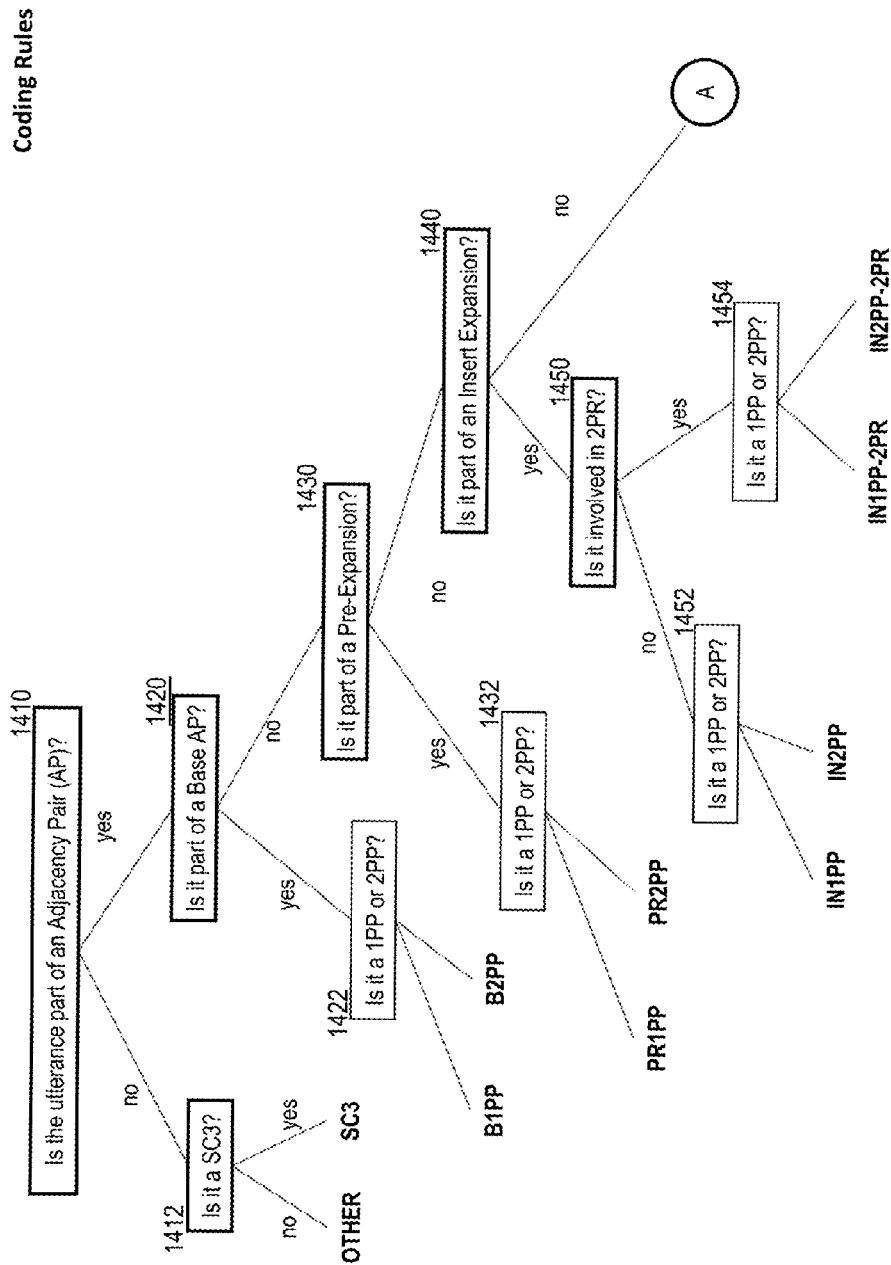
FIG. 14 illustrates flowcharts for identifying an adjacency pair position of the utterance and determining the structural label of the adjacency pair position in accordance with an embodiment.
Figure 15:
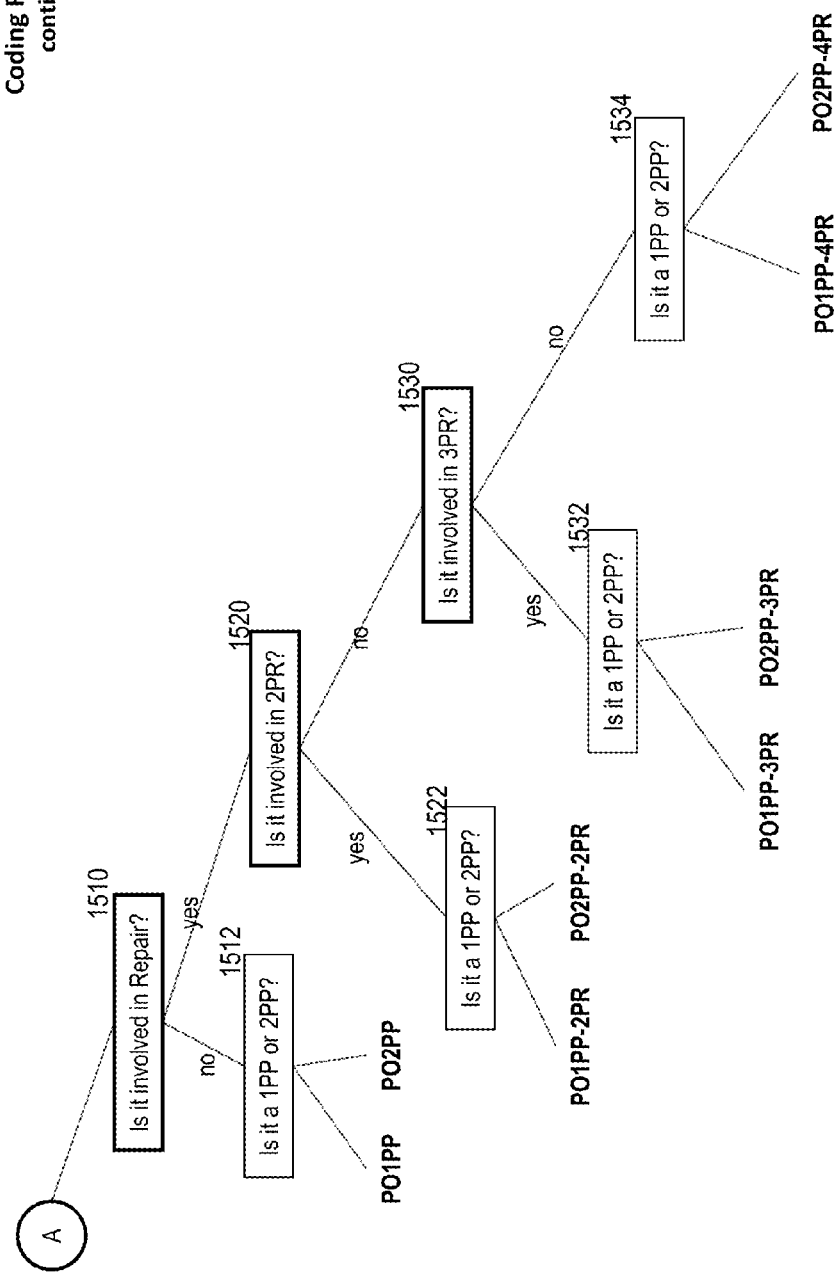
FIG. 15 illustrates flowcharts for identifying an adjacency pair position of the utterance and determining the structural label of the adjacency pair position in accordance with an embodiment.

Referring back to FIG. 5, as the dialog system 10 is receiving and generating each utterance, the dialog system 10 identifies an adjacency pair position of the utterance using the adjacency pair model, as shown at block 515. Further, the dialog system 10, based on the predetermined labeling scheme 40, determines a structural label of the adjacency pair position corresponding to each utterance, as shown at block 520. The dialog system 10 stores the labeled utterances, as shown at block 525. FIG. 14 and FIG. 15 illustrate flowcharts for identifying an adjacency pair position of the utterance and determining the structural label of the adjacency pair position. The dialog system 10 may implement the logic of the flowchart, such as by executing computer executable instructions. The dialog system 10 may implement the logic after each utterance is received from the user 30. Additionally, the dialog system 10 implements the logic after each utterance is generated, or upon presenting the generated utterance to the user 30.

For example, referring to FIG. 14, the dialog system 10 determines if the utterance is part of an adjacency pair, as shown at block 1410. If not, the dialog system 10 determines if the utterance is a closing sequence, as shown at block 1412, and labels the utterance with the corresponding label from the labeling scheme 40. It is to be noted that although the illustrated example uses the labels from the example labeling scheme 40 from FIG. 4, other labels are of course possible. Alternatively, if the utterance is part of an adjacency pair, the dialog system 10 determines if the utterance is part of the base adjacency pair, as shown at block 1420. If so, the dialog system 10 labels the utterance as the first pair-part or the second pair-part of the base pair, as shown at block 1422.

Alternatively, if the utterance is not part of the base adjacency pair, that is the adjacency pair is not a base pair, the dialog system 10 checks if the adjacency pair is a pre-expansion pair, as shown at block 1430. If so, the dialog system 10 labels the utterance as either the first pair-part or the second pair-part of the pre-expansion adjacency pair, as shown at block 1432.

If the dialog system 10 determines that, the adjacency pair is not a pre-expansion adjacency pair, the dialog system determines whether the utterance is part of an insert expansion, as shown at block 1440. If the utterance is part of an insert expansion, the dialog system 10 further determines if the utterance is part of a repair sequence, as shown at block 1450. If the adjacency pair of the utterance is not a repair sequence, the dialog system 10 labels the utterance as either a first pair-part or a second pair-part of the insert expansion, as shown at block 1452. Else, if the insert expansion is a repair sequence, the dialog system 10 labels the utterance as an initiator part (first pair-part) or a repair part (second pair-part) of an insert expansion $2^{nd}$ position repair as shown at block 1454.

Alternatively, if the dialog system 10 determines that, the adjacency pair is not an insertion expansion, the dialog system determines if the utterance is part of a repair sequence, as shown at block 1510. If not, the dialog system 10 labels the utterance as a first pair-part or a second pair-part of a post-expansion adjacency pair, as shown at block 1512. Else, if the utterance is part of a repair sequence, the dialog system 10 checks if the adjacency pair is a $2^{nd}$ position repair, as shown at block 1520. If so, the utterance is labeled as an initiator part (first pair-part) or a repair part (second pair-part) of an insert expansion $2^{nd}$ position repair as shown at block 1522. Else, if the adjacency pair is not a $2^{nd}$ position repair, the dialog system 10 checks if the adjacency pair is part of a $3^{rd}$ position repair sequence, as shown at block 1530. If so, the utterance is labeled as an initiator part (first pair-part) or a repair part (second pair-part) of an insert expansion $3^{rd}$ position repair as shown at block 1532. Else, if the adjacency pair is not a $3^{rd}$ position repair, the dialog system 10 labels the utterance as an initiator part (first pair-part) or a repair part (second pair-part) of an insert expansion $4^{th}$ position repair as shown at block 1534.

FIG. 16 illustrates a result of an example execution of such a labeling method, where each utterance of a conversation between a machine and a user (human) is labeled according to the labeling scheme, which in turn is based on an adjacency pair model, as each utterance in the conversation is either received from the user or is generated and presented to the user. The illustrated result is an example record of labeled utterances 50. As can be deciphered from the illustrated example, the format of the labeled utterances is Utterance~Dialog-Act~Adjacency-Pair-Position, where the position identifies a part of the conversation and the label identifies the position according to the adjacency pair model. In another example, the labeled utterances 50 may not include the position, and instead be stored using a format Utterance~Label (that is, without a position).

The dialog system 10 stores and in an example, transmits such labeled utterances 50 to a statistical trainer or classifier for training a computer system, such as using neural networks, or other techniques to classify parts of a conversation using the adjacency pair model. For example, once the computer system is trained using the labeled utterances 50 generated using the technical solutions described herein, the computer system may be used to label transcripts of other conversations according to the training. In an example, the labeled utterances 50 may be reviewed and corrected before being used for training.

The present technical solutions may be implemented as a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A computer implemented method for generating structured conversational data, the method comprising:
   receiving, by a processor, an utterance that is part of a conversation;
   identifying, by the processor, the utterance as part of an adjacency pair, wherein the adjacency pair comprises two utterances, each produced by different speakers; and
   associating, by the processor, the utterance with a label from a predetermined set of labels based on the identifying of the adjacency pair, and wherein associating the utterance with the label further comprises:
      determining if the adjacency pair is a base pair; and
      in response to the adjacency pair being a base pair, selecting the label corresponding either to a first pair-part of the base pair or a second pair-part of the base pair.

2. The computer implemented method of claim 1, wherein the predetermined set of labels, which comprises a plurality of labels corresponding to respective positions according to an adjacency pair model.

3. The computer implemented method of claim 1, wherein the method further comprises, initiating, by the processor, the conversation between a machine and a human user and the adjacency pair includes one utterance by the machine and one utterance from the human user.

4. The computer implemented method of claim 1, wherein the method further includes, determining a type of the adjacency pair and wherein, the label of the utterance is further based on the type of the adjacency pair.

5. The computer implemented method of claim 1, wherein associating the utterance with the label further comprises:
   determining if the adjacency pair is a pre-expansion pair; and
   in response to the adjacency pair being a pre-expansion pair, selecting the label corresponding either to a first pair-part of the pre-expansion pair or a second pair-part of the pre-expansion pair.

6. The computer implemented method of claim 1, wherein associating the utterance with the label further comprises:
   determining if the adjacency pair is an insert expansion pair; in response to the adjacency pair being an insert expansion pair:
   determining if the adjacency pair is a second position repair sequence;
   in response to the adjacency pair not being a second position repair sequence selecting the label corresponding either to a first pair-part of the insert expansion pair or a second pair-part of the insert expansion pair; and
   in response to the adjacency pair being a second position repair sequence selecting the label corresponding either to an initiator part of the second position repair pair or a repair part the second position repair pair.

7. The computer implemented method of claim 6, wherein associating the utterance with the label further comprises:
   in response to the adjacency pair not being an insert expansion pair and the adjacency pair not being a repair pair, selecting the label corresponding either to a first pair-part of a post-expansion pair or a second pair-part of the post-expansion pair.

8. The computer implemented method of claim 6, wherein associating the utterance with the label further comprises:
   in response to the adjacency pair not being an insert expansion pair and the adjacency pair being a repair pair determining a type of repair performed by the adjacency pair.

9. A system for generating structured conversational data, the system comprising:
   a memory; and a processor configured to:
      receive an utterance that is part of a conversation;
      identify the utterance as part of an adjacency pair, wherein the adjacency pair comprises two utterances, each produced by different speakers; and
      associate the utterance with a label from a predetermined set of labels based on the identifying of the adjacency pair, wherein associating the utterance with the label further comprises:
         determining if the adjacency pair is a base pair; and
         in response to the adjacency pair being a base pair, selecting the label corresponding either to a first pair-part of the base pair or a second pair-part of the base pair.

10. The system of claim 9, wherein the processor is further configured to initiate the conversation between a machine and a human user and the adjacency pair includes one utterance by the machine and one utterance from the human user.

11. The system of claim 9, wherein the processor is further configured to determine a type of the adjacency pair and wherein, the label of the utterance is further based on the type of the adjacency pair.

12. The system of claim 9, wherein associating the utterance with the label further comprises:
   determining if the adjacency pair is a pre-expansion pair; and
   in response to the adjacency pair being a pre-expansion pair, selecting the label corresponding either to a first pair-part of the pre-expansion pair or a second pair-part of the pre-expansion pair.

13. The system of claim 9, wherein associating the utterance with the label further comprises:
   determining if the adjacency pair is an insert expansion pair;
   in response to the adjacency pair being an insert expansion pair:
      determining if the adjacency pair is a second position repair sequence;
      in response to the adjacency pair not being a second position repair sequence selecting the label corresponding either to a first pair-part of the insert expansion pair or a second pair-part of the insert expansion pair; and
      in response to the adjacency pair being a second position repair sequence selecting the label corresponding either to an initiator part of the second position repair pair or a repair part the second position repair pair.

14. The system of claim 13, wherein associating the utterance with the label further comprises:
   in response to the adjacency pair not being an insert expansion pair and the adjacency pair not being a repair pair, selecting the label corresponding either to a first pair-part of a post-expansion pair or a second pair-part of the post-expansion pair.

15. A computer program product for generating structured conversational data, the computer program product comprising a computer readable storage medium, the computer readable storage medium comprising computer executable instructions, wherein the computer readable storage medium comprises instructions for:
   receiving, by a processor, an utterance that is part of a conversation;
   identifying, by the processor, the utterance as part of an adjacency pair, wherein the adjacency pair comprises two utterances, each produced by different speakers; and
   associating, by the processor, the utterance with a label from a predetermined set of labels based on the identifying of the adjacency pair, wherein the associating comprises determining a type of the adjacency pair, the label of the utterance is being based on the type of the adjacency pair.

16. The computer program product of claim 15, wherein the type of the adjacency pair is one of a base pair, a pre-expansion pair, an insert expansion pair, a post-expansion pair, and a repair pair.

17. The computer program product of claim 15, wherein associating the utterance with the label further comprises:
   determining if the adjacency pair is a base pair, and in response to the adjacency pair being a base pair, selecting the label corresponding either to a first pair-part of the base pair or a second pair-part of the base pair;
   in response to the adjacency pair not being a base pair, determining if the adjacency pair is a pre-expansion pair, and in response to the adjacency pair being a preexpansion pair, selecting the label corresponding either to a first pair-part of the preexpansion pair or a second pair-part of the pre-expansion pair; and
   in response to the adjacency pair not being a base pair, nor a pre-expansion pair, determining if the adjacency pair is an insert expansion pair, and in response to the adjacency pair being an insert expansion pair:
   determining if the adjacency pair is a second position repair sequence;
   in response to the adjacency pair not being a second position repair sequence selecting the label corresponding either to a first pair-part of the insert expansion pair or a second pair-part of the insert expansion pair; and
   in response to the adjacency pair being a second position repair sequence selecting the label corresponding either to an initiator part of the second position repair pair or a repair part the second position repair pair.

* * * * *